United States Patent
Sampath et al.

(10) Patent No.: US 7,966,011 B2
(45) Date of Patent: Jun. 21, 2011

(54) DETERMINING PER SECTOR RECEIVED POWER LEVEL

(75) Inventors: Hemanth Sampath, San Diego, CA (US); Edward H. Teague, San Diego, CA (US); Dhananjay Ashok Gore, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 586 days.

(21) Appl. No.: 12/054,175

(22) Filed: Mar. 24, 2008

(65) Prior Publication Data

US 2008/0242294 A1  Oct. 2, 2008

Related U.S. Application Data

(60) Provisional application No. 60/896,972, filed on Mar. 26, 2007.

(51) Int. Cl.
*H04W 24/00* (2009.01)

(52) U.S. Cl. ..... 455/425; 455/450; 455/464; 455/450.1; 370/329; 370/341

(58) Field of Classification Search .......... None
See application file for complete search history.

(56) References Cited

U.S. PATENT DOCUMENTS

| | | | |
|---|---|---|---|
| 6,609,007 B1 * | 8/2003 | Eibling et al. | 455/522 |
| 6,611,500 B1 * | 8/2003 | Clarkson et al. | 370/252 |
| 7,151,740 B2 | 12/2006 | Zhang et al. | |
| 7,277,721 B2 | 10/2007 | Okumura et al. | |
| 2003/0130003 A1 * | 7/2003 | Won | 455/522 |
| 2006/0094435 A1 * | 5/2006 | Thomas et al. | 455/450 |
| 2007/0064641 A1 * | 3/2007 | Laroia et al. | 370/320 |
| 2007/0099666 A1 * | 5/2007 | Astely et al. | 455/562.1 |
| 2007/0254601 A1 * | 11/2007 | Li et al. | 455/88 |
| 2007/0281624 A1 * | 12/2007 | Thomas et al. | 455/67.11 |
| 2008/0298275 A1 * | 12/2008 | De Sousa | 370/255 |
| 2010/0220626 A1 * | 9/2010 | Das et al. | 370/252 |

FOREIGN PATENT DOCUMENTS

| | | |
|---|---|---|
| EP | 1437906 | 7/2004 |
| WO | 2004075577 | 9/2004 |
| WO | 2004082308 | 9/2004 |

OTHER PUBLICATIONS

International Search Report—PCT/US08/058303—International Search Authority, European Patent Office—Aug. 13, 2008.
Written Opinion—PCT/US08/058303—International Search Authority, European Patent Office—Aug. 13, 2008.

* cited by examiner

*Primary Examiner* — Ajit Patel
(74) *Attorney, Agent, or Firm* — Howard H. Seo

(57) ABSTRACT

At a mobile device, a total received power represents signals received from all access points. In order to calculate an appropriate transmit power for communication with a single access point, a mobile device determines a per sector received power level. The mobile device can ascertain a time-domain channel response from each access point pilot signal, ascertain a received digital power lever per sector from each access point pilot signal and, based in part on the digital power level, calculate a received power level from each access point. A per sector received power level can be utilized to conserve battery power and/or to reduce interference in a wireless communications network.

24 Claims, 9 Drawing Sheets

DETERMINING PER SECTOR RECEIVED POWER LEVEL

CROSS-REFERENCE

This application claims the benefit of U.S. Provisional Application Ser. No. 60/896,972, filed Mar. 26, 2007, entitled "METHOD AND APPARATUS FOR DETERMINING PER SECTOR RECEIVED POWER LEVEL AT AN ACCESS TERMINAL," and assigned to the assignee hereof and the entirety of which is incorporated herein by reference.

BACKGROUND

I. Field

The following description relates generally to wireless communication systems and more particularly to determining a received power level on a per sector basis.

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, orthogonal frequency division multiple access (OFDMA) systems, and other systems.

Generally, a wireless multiple-access communication system can simultaneously support communication for multiple wireless terminals. Each terminal communicates with one or more base stations through transmissions on the forward and reverse links. The forward link (or downlink) refers to the communication link from the base stations to the terminals, and the reverse link (or uplink) refers to the communication link from the terminals to the base stations. This communication link may be established though a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and a frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

If there is only one base station transmitting and the signals from this base station are received at the terminal, the terminal can determine the amount of transmit power needed to close the link so that the signal sent by the terminal is received at the base station. However, in many situations, multiple base stations can be transmitting at substantially the same time and a terminal can receive signals from all these base stations. Since the total power from all base stations is received, the terminal does not know the transmit power needed to communicate with a single base station. This can result in excessive power in the transmission sent by the terminal and, thus, excess interference to other terminals. It can also result in a shorter battery life since more power than necessary might be transmitted.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with determining a received power level on a sector by sector basis. An aspect relates to a method for determining per sector received power level. The method includes receiving an access point pilot signal from each access point and determining a time-domain channel response from each access point pilot signal. The method also includes determining a received digital power level per sector from each access point pilot signal and determining a received power level from each access point based on at least the digital power level. The access point can represent a sector.

Another aspect relates to a wireless communications apparatus that includes a memory and a processor. The memory can retain instructions related to receiving an access point pilot signal from each access point and determining a time-domain channel response from each access point pilot signal. Further, the memory can retain instructions related to establishing a received digital power level per sector from each access point pilot signal. The memory can also retain instructions relating to calculating a received power level from each access point based on at least the digital power level. Each access point can represent a sector. The processor can be coupled to the memory and can be configured to execute the instructions retained in the memory.

A further aspect relates to a wireless communications apparatus operable in a wireless communication system. The apparatus can comprise a means for receiving a plurality of access point pilot signals and a means for determining a time-domain channel response from each access point pilot signal of the plurality of access point pilot signals. The apparatus can also comprise a means for determining a received digital power level per sector from each access point pilot signal and a means for determining a received power level from each access point based on at least the digital power level.

Yet another aspect relates to a machine-readable medium having stored thereon machine-executable instructions for determining a per sector received power level. The machine-executable instructions can comprise receiving a plurality of access point pilot signals, each access point pilot signal is from a single access point and determining a time-domain channel response from each access point pilot signal of the plurality of access point pilot signals. The machine-executable instructions can also comprise establishing a received digital power level per sector from each access point pilot signal and calculating a received power level from each access point based on at least the digital power level. The received power level from each access point can be computed from the digital power level per sector, an Analog Front-End Receiver Gain, a Digital Front-End Receiver Gain, and a total received power at an output of an Analog-to-Digital Converter (ADC).

In a wireless communications system, another aspect relates to an apparatus that comprises a processor. The processor can be configured to receive a plurality of access point pilot signals, each pilot signal can be from a different access point. The processor can also be configured to ascertain a time-domain channel response from each access point pilot signal. Further, the processor can be configured to determine a received digital power level per sector from each access point pilot signal and calculate a received power level from each access point based on at least the digital power level.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
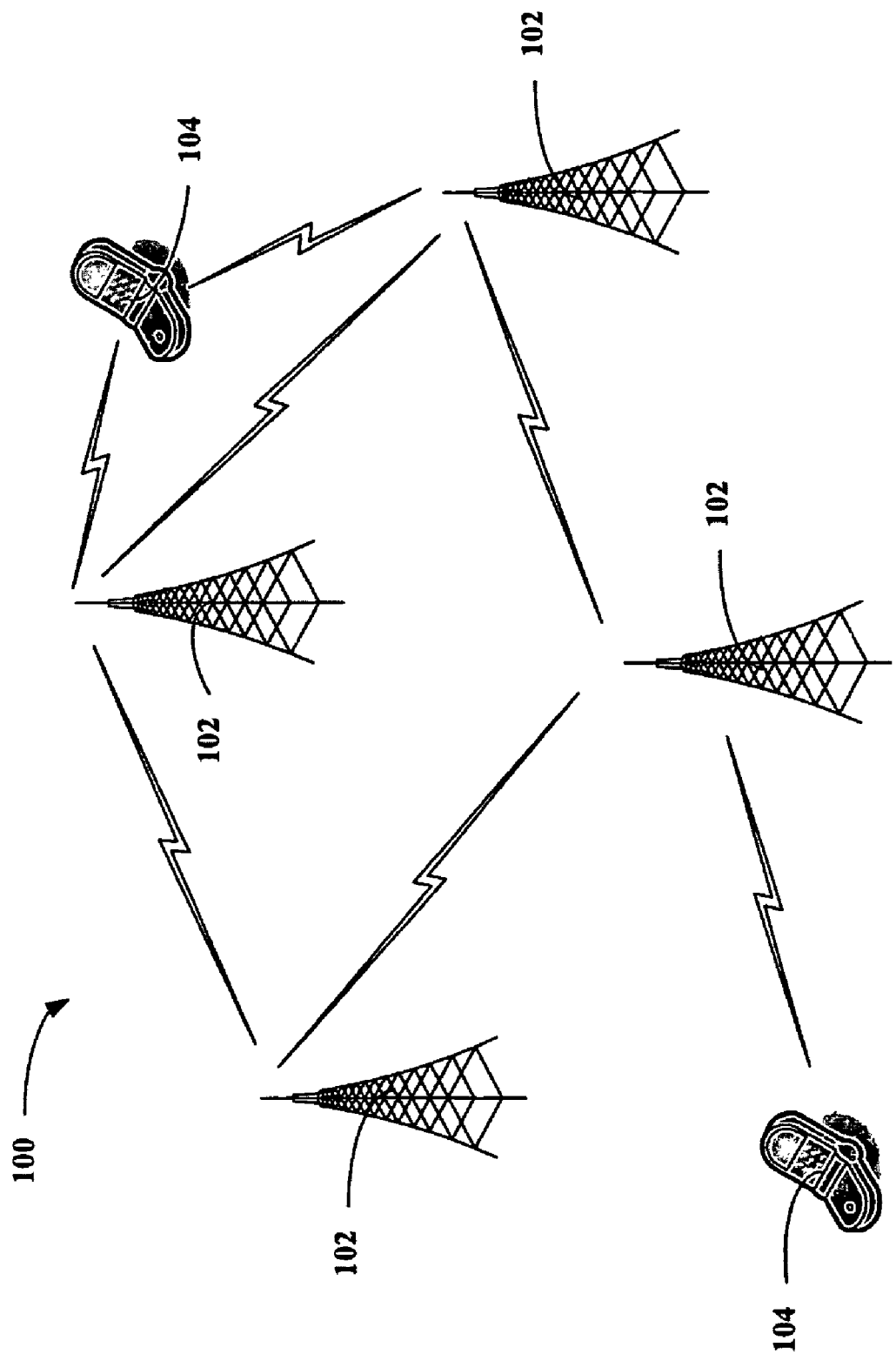
FIG. 1 illustrates a wireless communication system in accordance with various aspects presented herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal. A wireless terminal can also be called a system, subscriber unit, subscriber station, mobile station, mobile, mobile device, device remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, and/or another processing device for communicating over a wireless system. Moreover, various aspects are described herein in connection with a base station. A base station may be utilized for communicating with wireless terminal(s) and may also be referred to as an access point, Node B, or some other terminology.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 in accordance with various aspects presented herein is illustrated. System 100 can comprise one or more base stations 102 in one or more sectors that receive, transmit, repeat, etc., wireless communication signals to each other and/or to one or more mobile devices 104. Each base station 102 can comprise multiple transmitter chains and receiver chains (e.g., one for each transmit and receive antenna), each of which can in turn comprise a plurality of components associated with signal transmission and reception (e.g., processors, modulators, multiplexers, demodulators, demultiplexers, antennas, etc.). Each mobile device 104 can comprise one or more transmitter chains and receiver chains, which can be utilized for a multiple input multiple output (MIMO) system. Each transmitter and receiver chain can comprise a plurality of components associated with signal transmission and reception (e.g., processors, modulators, multiplexers, demodulators, demultiplexers, antennas, etc.), as will be appreciated by one skilled in the art.

The various base stations 102 can be transmitting signals at substantially the same time. Each of these signals is combined and the total sum of power received at a mobile device. System 100 can be configured to determine, at a mobile device, a received power on a per sector basis. Based on this determined received power, the mobile device can adjusts is transmit power to communicate with a desired base station. Determining the received power on a per sector basis can assist the mobile device to set a transmit power at a level that is not too high, and thus causes excessive interference, and not too low, which might result in the base station not receiving a signal from the mobile device. Transmitting at an appropriate power level can also conserve system resources, such as battery consumption.

Figure 2:
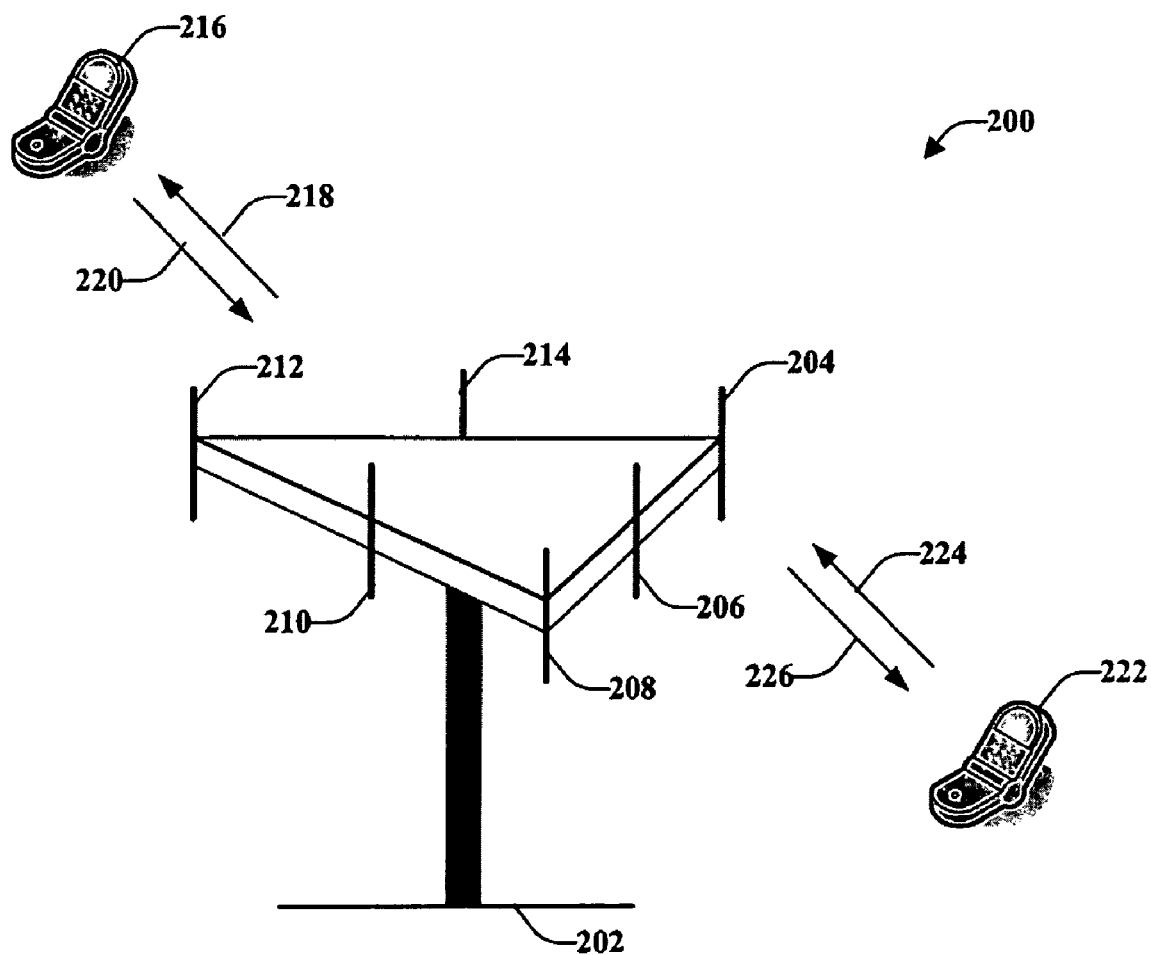
FIG. 2 illustrates a multiple access wireless communication system according to one or more aspects.

Referring now to FIG. 2, a multiple access wireless communication system 200 according to one or more aspects is illustrated. A wireless communication system 200 can include one or more base stations in contact with one or more user devices. Each base station provides coverage for a plurality of sectors. A three-sector base station 202 includes multiple antenna groups, one including antennas 204 and 206, another including antennas 208 and 210, and a third including antennas 212 and 214. According to the figure, only two antennas are shown for each antenna group, however, more or fewer antennas may be utilized for each antenna group. Mobile device 216 is in communication with antennas 212 and 214, where antennas 212 and 214 transmit information to mobile device 216 over forward link 220 and receive information from mobile device 216 over reverse link 218. Forward link (or downlink) refers to the communication link from the base stations to mobile devices, and the reverse link (or uplink) refers to the communication link from mobile devices to the base stations. Mobile device 222 is in communication with antennas 204 and 206, where antennas 204 and 206 transmit information to mobile device 222 over forward link 226 and receive information from mobile device 222 over reverse link 224.

Each group of antennas and/or the area in which they are designated to communicate may be referred to as a sector of base station 202. In one or more aspects, antenna groups each are designed to communicate to mobile devices in a sector or the areas covered by base station 202. A base station may be a fixed station used for communicating with the terminals.

By controlling power at the mobile device, the disclosed aspects can prolong battery life of the mobile device and/or mitigate interference caused to other mobile devices. Battery life can be prolonged because the mobile device is not transmitting extra power than what is necessary to communicate with a particular base station. Additionally or alternatively, if the mobile device is transmitting at a proper power level, the interference costs to the other mobile devices within the cellular network is mitigated and the other mobile devices (and device users) can have a better experience within a cellular network.

Figure 3:
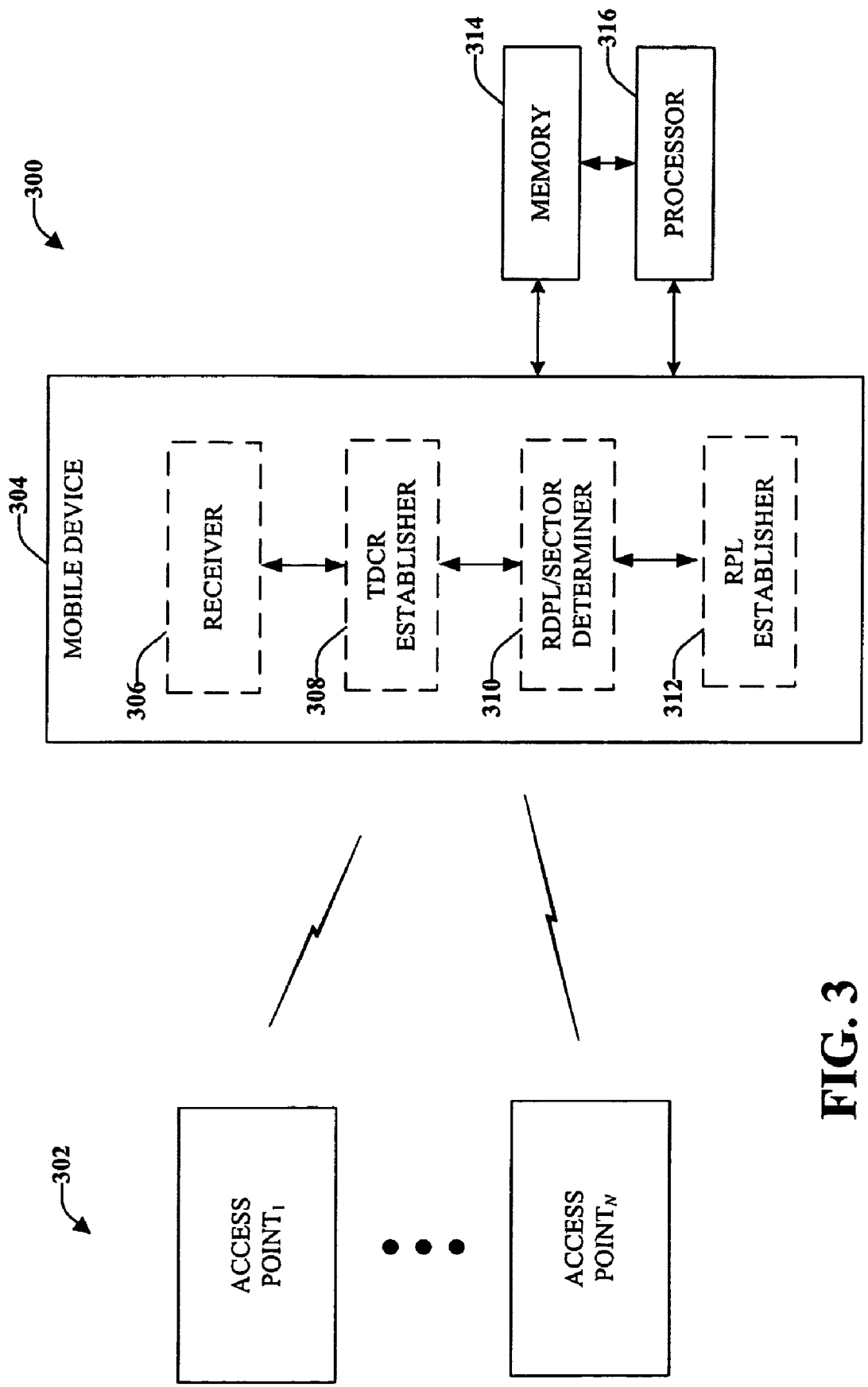
FIG. 3 illustrates a wireless communication system for determining a per sector received power level in accordance with the disclosed aspects.

FIG. 3 illustrates a wireless communication system 300 for determining a per sector received power level in accordance with the disclosed aspects. In a wireless communication system 300, there can be multiple access points that transmit to multiple mobile devices. When a mobile device desires to transmit to one of the access points at a certain power, the mobile device performs a power control algorithm. The typical power control algorithm is simple if there is one access point because the power level is measured at a receiver antenna of the mobile device to determine how much transmit power is needed to close the link so that the signal sent by the mobile device is received at the access point. The measurement at the receive antenna is referred to as the Received Signal Strength Indicator (RSSI) measurement. However, when there are multiple access points transmitting signals, the sum of the power of all signals is received at the mobile device. In this situation, the RSSI measurement cannot be relied upon because it is the sum total of the power from all the access points. System 300 can be configured to allow the mobile device to determine, based on the sum total of power received, an individual power transmitted by each access point to determine an appropriate power factor (taking into consideration other criteria, such as fading and so forth).

Multiple access points, labeled Access Point 1 through Access Point N, where N is an integer, and referred to collectively as Access Points 302 are in wireless communication with a mobile device 304. Although there can be multiple mobile devices in a wireless communication system, as will be appreciated, a single mobile device 304 is illustrated for purposes of simplicity. It should be noted that the wireless communication system 300 could be any type of wireless communication. Thus, although the various aspects disclosed herein might be with reference to an OFDMA system, other systems (e.g., CDMA, TMDA, and so forth), can be utilize with the disclosed aspects. In accordance with some aspects, a channel structure can be provided that preserves low peak-to-average power ratio (PAR) (at any given time, the channel is contiguous or uniformly spaced in frequency) properties of a single carrier waveform.

Received Signal Strength Indication (RSSI) measurements made at mobile device 304 typically include the total power received at the mobile device 304 from all access points 302 or sectors. Although this total power measurement is useful for algorithms, such as automatic gain control (AGC), it is not of much use to algorithms such as power control. Thus, it is useful to determine the per sector (per access point) received power at mobile device 304. The received power level for each sector can be utilized, for example, to control the power levels for the Reverse Link Serving Sector (RLSS) as well as for determining handoff of the mobile device 304.

Mobile device 304 can include a receiver 306 that can be configured to receive an access point (sector) pilot signal for each access point 302. The receiver 306 can be associated with a receive antenna. The access point pilot signal can be existing pilot signals already transmitted by each access point 302, but the access point pilot signal is utilized by mobile device 304 to ultimately determine the power level received from each access point 302. In particular, an access point 302 typically sends broadband pilot signals that are scrambled with a sector scrambling sequence.

A time-domain channel response (TDCR) establisher 308 can be configured to determine a time-domain channel response from each received access point pilot signal. The TDCR determiner 308 can determine the time-domain channel response from each access point pilot signal by obtaining the per sector channel tap estimation of sector specific received signal power. These channel estimates can be computed based on the broadband pilot present in two consecutive OFDM symbols of every superframe preamble. This broadband pilot is referred to herein as the F-CPICH. The two consecutive OFDM Symbols the F-CPICH resides on is referred to herein as the F-CPICH OFDM Symbol indexed 0 and 1. The pilot signal occupies a set of tones uniformly spaced apart by $\Delta$ in each of these OFDM Symbols and the tone indices of the first pilot tone in each of these OFDM Symbols differ by $\Delta/2$. It is to be appreciated that other broadband pilots would suffice for this purpose as well.

A Received Digital Power Level (RDPL) per Sector Determiner 310 can be configured to determine a received digital power level per sector (access point) from each access point pilot signal, which will be discussed further below.

Also included is a Received Power Level (RPL) establisher 312 that can be configured to determine a Received Power Level (RPL) at the antenna of the mobile device 304 for each access point. The RPL can be determined by utilizing at least the digital power level per sector (RDPL) value, and this value can be combined with other standard power measurements, such as an AGC gain and a total received power measured at the output of an Analog-to-Digital Converter (ADC) (not shown), to determine the received power level at the antenna of the mobile device 304 for each access point 302. The received power level at the antenna for each sector can be utilized to set the transmit power of the RLSS and to determine handoff.

System 300 can include memory 314 operatively coupled to mobile device 304. Memory 314 can be external to mobile device 304 or can reside within mobile device 304. Memory 314 can store information related to receiving an access point pilot signal from each access point, determining a time-domain channel response from each access point pilot signal, determining a received digital power level per sector from each access point pilot signal, and determining the received power level from each access point based on at least the digital power level, and other suitable information related to determining a received power level in a communication network. A processor 316 can be operatively connected to mobile device 304 (and/or memory 314) to facilitate analysis of information related to determining a received power level from each access point (sector) in a communication network. Processor 316 can be a processor dedicated to analyzing and/or generating information received by mobile device 304, a processor that controls one or more components of system 300, and/or a processor that both analyzes and generates information received by mobile device 304 and controls one or more components of system 300.

Memory 314 can store protocols associated with power control measurements and calculations related to such measurements, taking action to control communication between mobile device 304 and base stations 302, etc., such that system 300 can employ stored protocols and/or algorithms to determine per sector received power level in a wireless network as described herein. It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 314 of the disclosed aspects are intended to comprise, without being limited to, these and other suitable types of memory.

Figure 4:
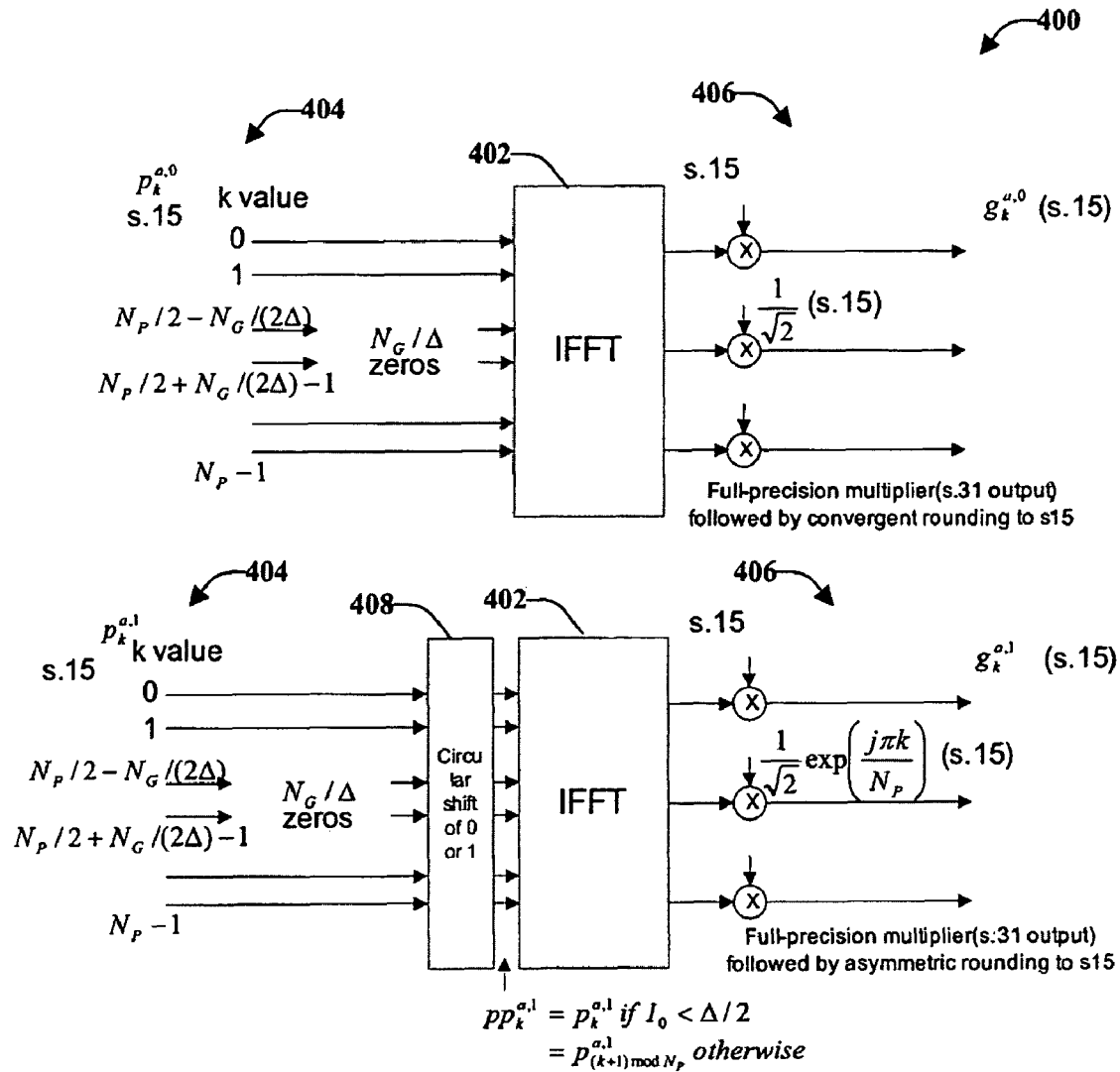
FIG. 4 illustrates a schematic representation of an example Inverse Fast Fourier Transform (IFFT) in accordance with the disclosed aspects.

FIG. 4 illustrates a schematic representation of an example Inverse Fast Fourier Transform (IFFT) 400 in accordance with the disclosed aspects. The top of the figure illustrates an IFFT 402 that receives inputs 404, which are processed by the IFFT 402, to create outputs 406. The bottom of the figure is similar but also includes circularly shifting the inputs 408. Further detailed information relating to the processing will now be described.

Accordance to the figure all the input pilot observations $p_k^{a,s}$ that fall in the guard tones are replaced by zero. Since it is known that nothing was sent on those tones, those observations are only noise, and zeroing them improves performance.

Then for each a and s an $N_P$ point IFFT is taken and the k-th IFFT output is multiplied by $$\frac{1}{\sqrt{2}} \exp\left(\frac{j2\pi J_s k}{N_{FFT}}\right)$$

to arrive at the time domain channel taps. The phase ramp at the IFFT output is utilized to account for the pilot tone offset $I_s$. To obtain the true time-domain channel taps without any extraneous time-domain phase-ramp added to them, $J_s = I_s$ is utilized. However, to reduce the number of multiplications as well as to take advantage of the already available adjustable factors within the DSP, according to one aspect, $J_0 = 0$, $J_1 = I_1 - I_0$ is utilize. It should be noted that $I_1 = (I_0 + (\Delta/2))$ mod $\Delta$, and that $\Delta = N_{FFT}/N_P$, this indicates that F-CPICH OFDMSymbol 0 needs no rotations, while OFDMSymbol 1 needs rotations by $\exp(j\delta\pi k/N_P)$; where $k = 0, 1, \ldots, N_P - 1$; and $\delta$ is 1 if $I_0 < \Delta/2$ and $-1$ otherwise.

Further, the case of $\delta = -1$ is handled by writing $-1 = 1 - 2$, and implementing the multiplication by $\exp(-j2\pi k/N_P)$ by means of circularly shifting the IFFT input by 1. The uncancelled phase ramp resulting in the time-domain channel estimates does not affect the other portions of the algorithm. The outputs of each $N_P$ point IFFT can be processed to find the $2N_P$ time-domain channel tap estimates $t_k^a$.

After executing the operations in FIG. 4, then form the $2N_P$ point vector $t_k^a$ given by $t_k^a = (g_k^{a,0} + g_k^{a,1})/2$, $t_{k+N_P}^a = (g_k^{a,0} - g_k^{a,1})/2$, for $k = 0, 1, \ldots N_P - 1$. Here the sum, difference and divide by 2 are performed in full precision, followed by convergent rounding to s.15.

In accordance with an aspect, the received digital power level per sector is determined from the time-domain channel response from each access point pilot signal. In particular, referring to the above, the $$\text{cpich\_power}^a = \frac{1}{32} \sum_{j=0}^{31} |t_{loc_j}^a|^2.$$

In accordance with an aspect, the operations are performed in full precision, followed by truncation to s.15.

The received power level at the mobile device from each access point is based on at least the digital power level as determined above. In particular, the mean receiver power per-antenna per-sector is estimated by the CPICH Preamble processing block and is denoted as $p_{k,s}$, where k is the antenna index and s is the sector-index. These values are digital numbers, which according to an aspect, are translated to a dBm value. To this end, the estimated energy computed at the output of the ADC is utilized, since this value has a direct mapping to the dBm value, depending on the AGC gain state as will be discussed below. Denote the estimated energy parameter at the output of ADC as $E_k$. It should be noted that this parameter has contributions from all sectors.

According to an aspect, the estimated energy at the output of the ADC "per-sector" k is computed as follows:

$$E_{k,s} = \frac{p_{k,s}}{\sum_s p_{k,s}} E_k$$

wherein $p_{k,s}$ is a digital power per sector index s and antenna index k, and $E_k$ is the total received power at the output of the ADC The above estimated energy at the output of the ADC per sector can then be mapped to a dBm power level at the receive antennas by normalizing it to the full-scale ADC power and subtracting the analog gain as follows, in accordance with an aspect.

$$AE_{k,s} = 10\log_{10}\left[\frac{E_{k,s}}{2^{2(ADBitWidth-1)}}\right] - ADC\_PWR + REF\_PWR +$$
$$RX\_RFFE\_PATH\_LOSS + RX1\_OFFSET\_0\_7 \times I_{GainState1} +$$
$$RX1\_OFFSET\_7\_14 \times I_{GainState12} \text{(in dB}m\text{)}$$

where $I_{GainState1}$=1 when Analog Gain State 1 is active and Analog Gain State 2 is inactive; and $I_{GainState12}$=1 when Analog Gain States 1 and 2 are active. Otherwise these variables take on the value of 0.

It should be noted that parameter ADBitWidth=x-bits, wherein x is an integer and, in accordance with an aspect x is equal to 14, and that the calibration variables REF_PWR, RX_RFEE_PATH_LOSS, RX!_OFFSET_0_7 and RX1_OFFSET_7_14 are programmable parameters depending on the Analog Gain State hardware. It should also be noted that other aspects may have multiple AGC gain states and other programmable constants pertaining to the hardware concerned. Thus, the above formula is for illustration purposes in order to fully appreciate the disclosed aspects.

The mean received power averaged across all receive antennas (in dBm) is given as:

$$AF_s = 10\log_{10}\left[\frac{1}{M_R}\sum_k 10^{[AE_{k,s}/10]}\right] \text{(in dB}m\text{)}$$

where $M_R$ is the number of receiver antennas for the mobile device.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 5:
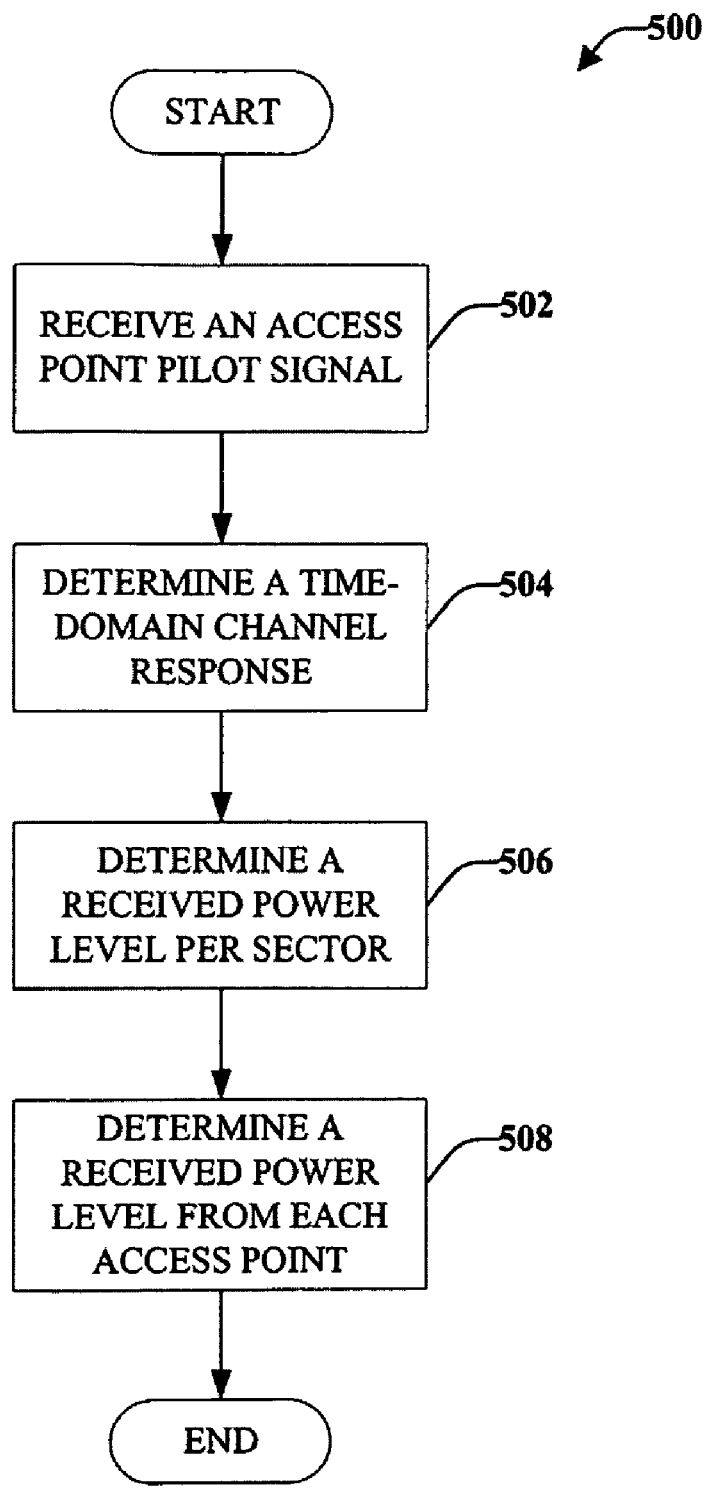
FIG. 5 illustrates a method for determining per sector received power level.

FIG. 5 illustrates a method 500 for determining per sector received power level. Method 500 can facilitate terminal power control in that the power of the terminal (e.g., mobile device) can be adjusted according to a received power from a base station with which the terminal is communicating, or desires to communicate. In such a manner, method 500 can facilitate prolonging the battery life of the terminal because the power is controlled and, thus, can mitigate extra power transmitted than what is necessary. Further, the terminal is not transmitting at a power much higher than what is necessary, and thus, mitigates the interference cost to other terminals.

Method 500 begins, at 502, when an access point pilot signal is received from each access point. The access point can also be referred to as a sector. It should be noted that it is the total power from all access points (within a certain geographic area or range) that are received.

At 504, a time-domain channel response from each access point (sector) pilot signal is determined. In accordance with some aspects, determining the time-domain channel response comprises obtaining a per sector channel tap estimation of sector specific received signal power. The channel estimates can be computed based on the broadband pilot present in two consecutive OFDM symbols of every superframe preamble.

A received digital power level per sector (access point) from each access point pilot signal is determined, at 506. In accordance with some aspects, the received digital power level per sector can be determined from the time-domain channel response from each access point pilot signal. In accordance with some aspects, the digital power level can be combined with an AGC gain and a total received power to determine the received power level.

At 508, the received power level from each access point is determined based on at least the digital power level. The received power level from each access point is computed from the digital power level per sector, an Analog Front-End Receiver Gain, a Digital Front-End Receiver Gain, and a total received power at an output of an Analog-to-Digital Converter (ADC). In accordance with some aspects, determining the received digital power level per sector is determined from a time-domain channel response from each access point pilot signal. The determined received power level is utilized to set a transmit power of a reverse link serving sector to determine handoff.

In accordance with some aspects, method 500 can also include computing an estimated energy at the output of an ADC per sector as $$E_{k,s} = \frac{p_{k,s}}{\sum_s p_{k,s}} E_k,$$

where $p_{k,s}$ is a digital power per sector index s and antenna index k, and $E_k$ is the total received power at the output of the ADC. This estimate can be mapped to a dBM power level at the receive antennas by normalizing it to a full-scale ADC power and subtracting the analog gain.

Figure 6:
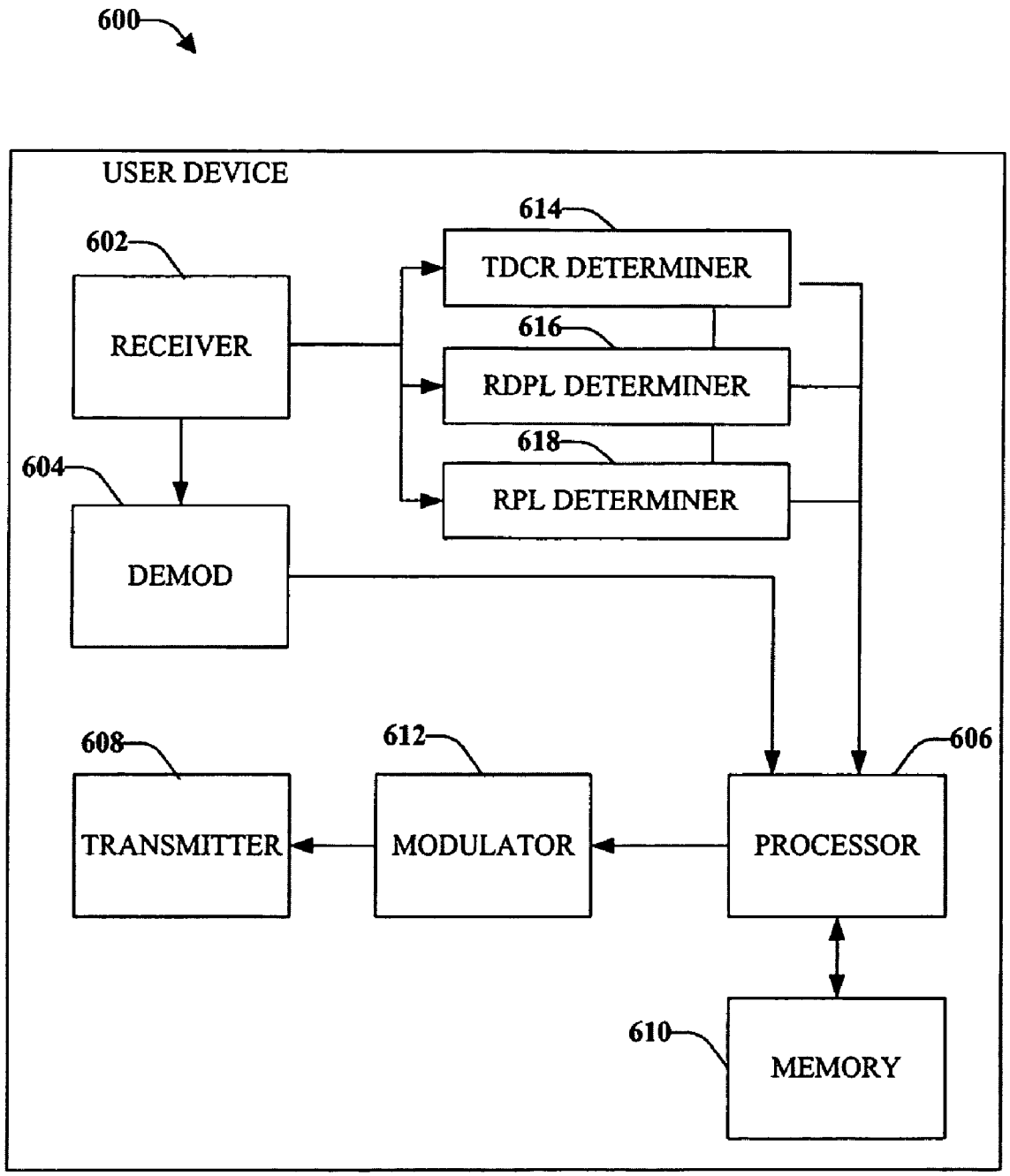
FIG. 6 illustrates a system that facilitates determining per sector received power level in accordance with one or more of the disclosed aspects.

With reference now to FIG. 6, illustrated is a system 600 that facilitates determining per sector received power level in accordance with one or more of the disclosed aspects. System 600 can reside in a user device. System 600 comprises a receiver 602 that can receive a signal from, for example, a receiver antenna. The receiver 602 can perform typical actions thereon, such as filtering, amplifying, downconverting, etc. the received signal. The receiver 602 can also digitize the conditioned signal to obtain samples. A demodulator 604 can obtain received symbols for each symbol period, as well as provide received symbols to a processor 606.

Processor 606 can be a processor dedicated to analyzing information received by receiver component 602 and/or generating information for transmission by a transmitter 608. In addition or alternatively, processor 606 can control one or more components of user device 600, analyze information received by receiver 602, generate information for transmission by transmitter 608, and/or control one or more components of user device 600. Processor 606 may include a controller component capable of coordinating communications with additional user devices.

User device 600 can additionally comprise memory 608 operatively coupled to processor 606 and that can store information related to coordinating communications and any other suitable information. Memory 610 can additionally store protocols associated with sample rearrangement. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems and/or methods is intended to comprise, without being limited to, these and any other suitable types of memory. User device 600 can further comprise a symbol modulator 612 and a transmitter 608 that transmits the modulated signal.

Receiver 602 is further operatively coupled to a time-domain channel response (TDCR) determiner 614 that can determine a TDCR from each access point pilot signal (e.g., each sector). Additionally, receiver 602 can be operatively coupled to a received digital power level (RDPL) determiner 616 that can ascertain the RDPL per sector from each access point pilot signal. Further, receiver 602 can be operatively coupled to a received power level (RPL) determiner 618 that can determine the RPL from each access point based in part on the digital power level. In accordance with some aspects, the received power level from each access point is computed from the digital power per sector, the Analog Front-End Receiver Gain, a Digital Front-End Receiver Gain, and a total received power at an output of the ADC.

Receiver 602 might also contain other component necessary to determine a received power level per sector, although such components are not illustrated. Such components can include, but are not limited to, an Analog-to-Digital Converter.

Figure 7:
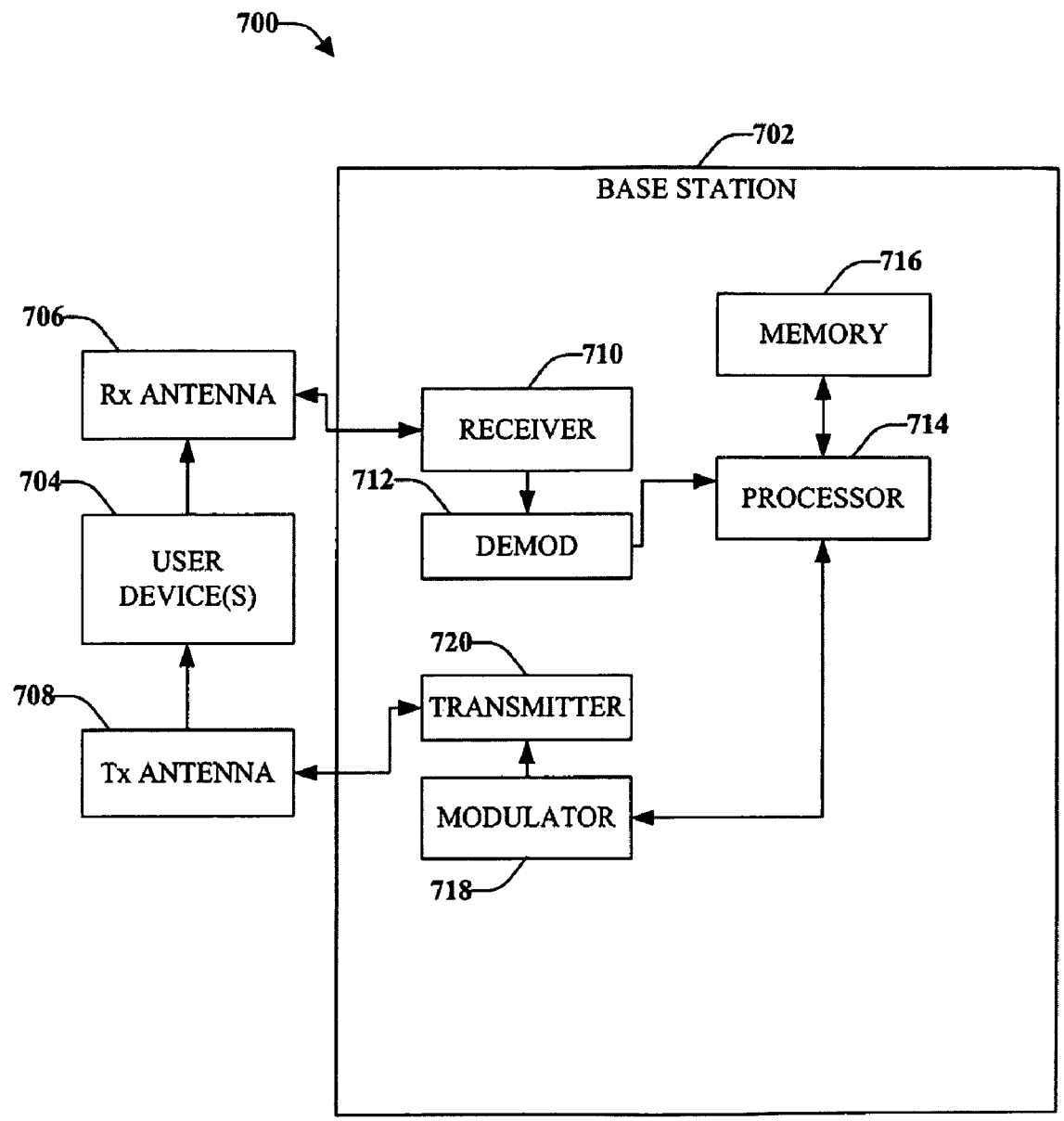
FIG. 7 is an illustration of a system that facilitates sample determining a received power level in accordance with various aspects presented herein.

FIG. 7 is an illustration of a system 700 that facilitates determining a received power level in accordance with various aspects presented herein. System 700 comprises a base station or access point 702. As illustrated, base station 702 receives signal(s) from one or more user devices 704 by a receive antenna 706, and transmits to the one or more user devices 704 through a transmit antenna 708.

Base station 702 comprises a receiver 710 that receives information from receive antenna 706 and is operatively associated with a demodulator 712 that demodulates received information. Demodulated symbols are analyzed by a processor 714 that is coupled to a memory 716 that stores information related to broadcast-multicast waveforms embedded in a unicast waveform. A modulator 718 can multiplex the signal for transmission by a transmitter 720 through transmit antenna 708 to user devices 704.

Figure 8:
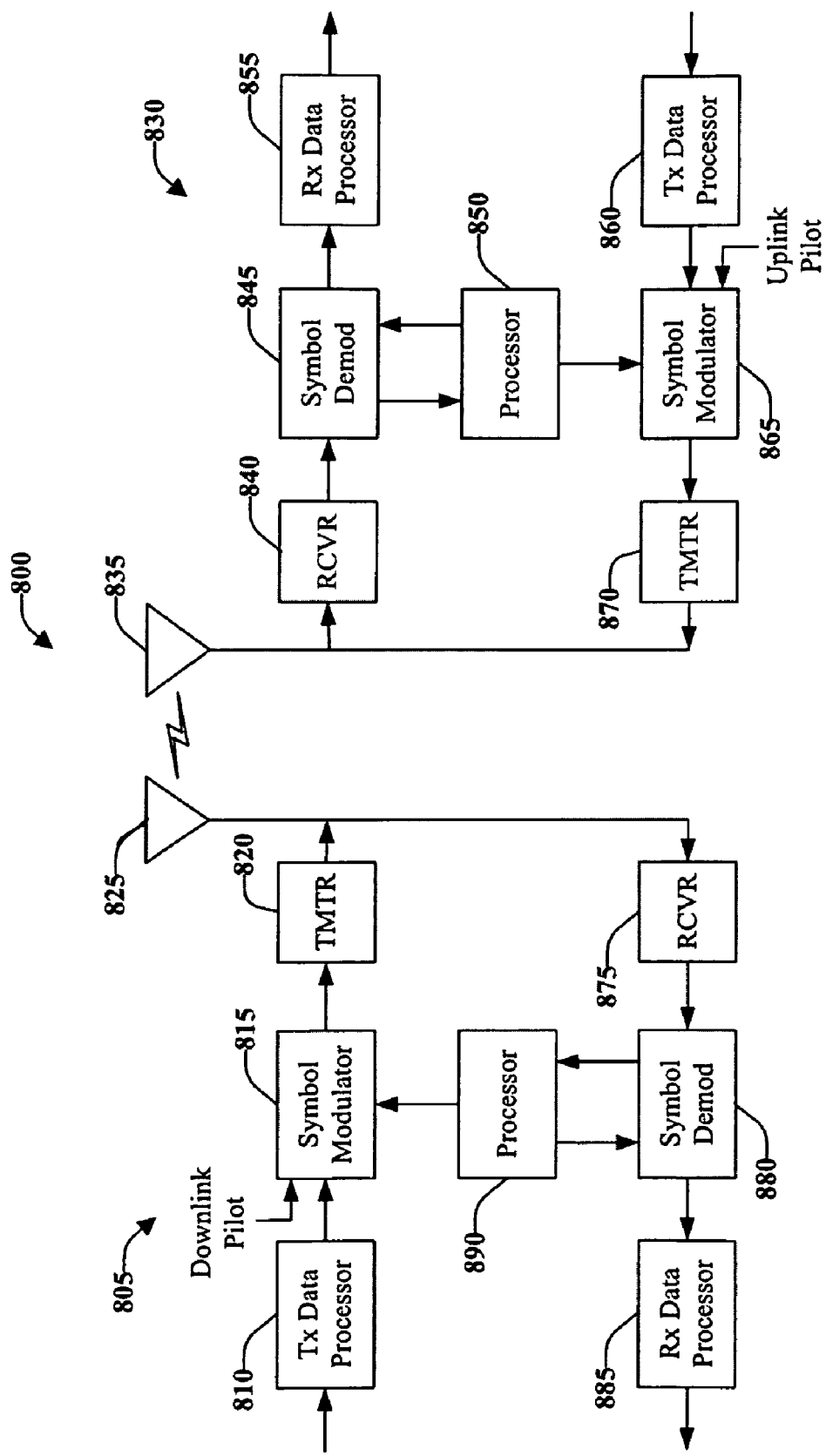
FIG. 8 illustrates an exemplary wireless communication system.

FIG. 8 illustrates an exemplary wireless communication system 800. Wireless communication system 800 depicts one base station and one terminal for sake of brevity. However, it is to be appreciated that system 800 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

Referring now to FIG. 8, on a downlink, at access point 805, a transmit (TX) data processor 810 receives, formats, codes, interleaves, and modulates (or symbol maps) traffic data and provides modulation symbols ("data symbols"). A symbol modulator 815 receives and processes the data symbols and pilot symbols and provides a stream of symbols. A symbol modulator 815 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 820 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 825 to the terminals. At terminal 830, an antenna 835 receives the downlink signal and provides a received signal to a receiver unit (RCVR) 840. Receiver unit 840 conditions (e.g., filters, amplifies, and frequency downconverts) the received signal and digitizes the conditioned signal to obtain samples. A symbol demodulator 845 obtains N received symbols and provides received pilot symbols to a processor 850 for channel estimation. Symbol demodulator 845 further receives a frequency response estimate for the downlink from processor 850, performs data demodulation on the received data symbols to obtain data symbol estimates (which are estimates of the transmitted data symbols), and provides the data symbol estimates to an RX data processor 855, which demodulates (i.e., symbol demaps), deinterleaves, and decodes the data symbol estimates to recover the transmitted traffic data. The processing by symbol demodulator 845 and RX data processor 855 is complementary to the processing by symbol modulator 815 and TX data processor 810, respectively, at access point 805.

On the uplink, a TX data processor 860 processes traffic data and provides data symbols. A symbol modulator 865 receives and multiplexes the data symbols with pilot symbols, performs modulation, and provides a stream of symbols. A transmitter unit 870 then receives and processes the stream of symbols to generate an uplink signal, which is transmitted by the antenna 835 to the access point 805.

At access point 805, the uplink signal from terminal 830 is received by the antenna 825 and processed by a receiver unit 875 to obtain samples. A symbol demodulator 880 then processes the samples and provides received pilot symbols and data symbol estimates for the uplink. An RX data processor 885 processes the data symbol estimates to recover the traffic data transmitted by terminal 830. A processor 890 performs channel estimation for each active terminal transmitting on the uplink.

Processors 890 and 850 direct (e.g., control, coordinate, manage, . . . ) operation at access point 805 and terminal 830, respectively. Respective processors 890 and 850 can be associated with memory units (not shown) that store program codes and data. Processors 890 and 850 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 890 and 850.

Figure 9:
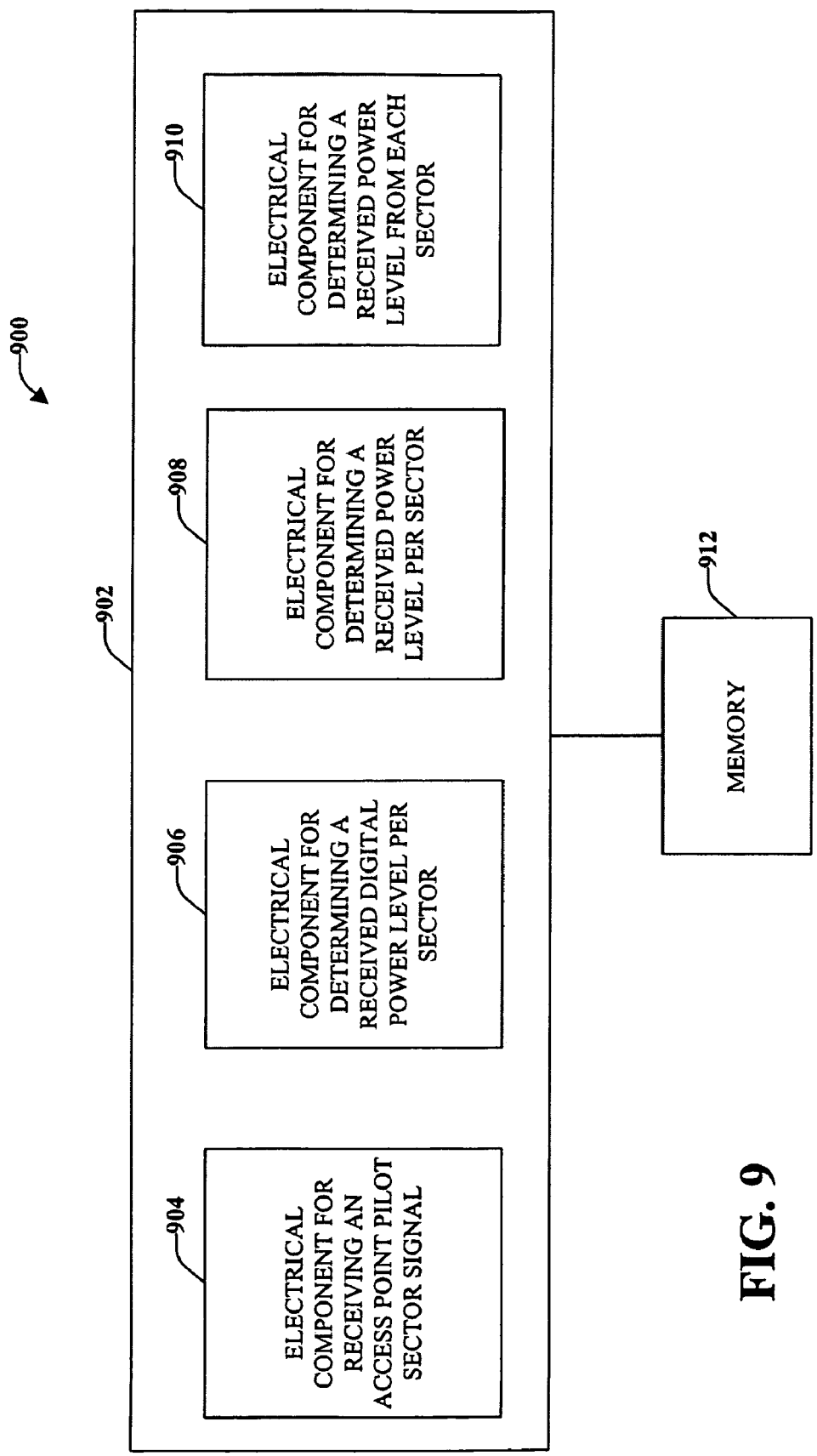
FIG. 9 illustrates an example system that facilitates determining per sector received power level.

With reference to FIG. 9, illustrated is an example system 900 that facilitates determining per sector received power level. System 900 can improve battery life and/or can mitigate interference in a wireless communications network. System 900 may reside at least partially within a mobile device. It is to be appreciated that system 900 is represented as including functional blocks, which may be functional blocks that represent functions implemented by a processor, software, or combination thereof (e.g., firmware).

System 900 includes a logical grouping 902 of electrical components that can act separately or in conjunction. For instance, logical grouping 902 may include an electrical component for receiving an access point pilot signal from each access point (or sector) 904. In accordance with some aspects, the received power level from each access point is computed from the digital power level per sector, an Analog Front-End Receiver Gain, a Digital Front-End Receiver Gain, and a total received power at an output of an Analog-to-Digital Converter.

Logical grouping 902 can also include an electrical component for determining a time-domain channel response from each access point (or sector) pilot signal 906. In accordance with some aspects, electrical component 906 obtains a per sector channel tap of sector specific received signal power to determine the time-domain channel response:

Further, logical grouping 902 can include an electrical component for determining a received digital power level per sector (access point) from each access point pilot signal 908. The digital power level per sector can be determined from a time-domain channel response from each access point pilot signal.

Also included in logical grouping can be an electrical component for determining the received power level from each access point based on at least the digital power level 910. In accordance with some aspects, the digital power level is combined with an AGC gain and a total received power to determine the received power level. The determined received power level can be utilized to set a transmit power of a reverse link serving sector to determine handoff.

In accordance with some aspects, logical grouping 902 can include an electrical component for computing an estimated energy at the output of an ADC per sector (not shown). Computing the estimated energy at the output of an ADC per sector can be given by $$E_{k,s} = \frac{p_{k,s}}{\sum_s p_{k,s}} E_k,$$

where $p_{k,s}$ is a digital power per sector index s and antenna index k, and $E_k$ is the total received power at the output of the ADC for sector-index s and antenna index k.

Additionally, system 900 can include a memory 912 that retains instructions for executing functions associated with electrical components 904, 906, 908, and 910 or other components. While shown as being external to memory 912, it is to be understood that one or more of electrical components 904, 906, 908, and 910 may exist within memory 912.

It is to be understood that the aspects described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within scope of the appended claims. To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for determining per sector received power level, comprising:
   receiving an access point pilot signal from each access point in a plurality of access points;
   determining a time-domain channel response from each of the access point pilot signals;
   determining a received digital power level per sector from each of the access point pilot signals;
   determining a received power level from each access point in the plurality of access points, based on at least the respective received digital power level, wherein the access point represents a sector; and
   computing an estimated energy at the output of an analog-to-digital converter (ADC) per sector as $$E_{k,s} = \frac{p_{k,s}}{\sum_s p_{k,s}} E_k,$$

wherein $p_{k,s}$ is a digital power per sector index s and antenna index k, and $E_k$ is the total received power at the output of the ADC.

2. The method of claim 1, wherein the received power level from each access point is computed from the digital power level per sector, an Analog Front-End Receiver Gain, a Digital Front-End Receiver Gain, and a total received power at an output of the ADC.

3. The method of claim 2, further comprising:
   mapping the estimated energy at the output of the ADC per sector to a dBm power level, comprising:
      normalizing the estimated energy to a full-scale ADC power, and;
      subtracting an analog gain.

4. The method of claim 1, wherein the determined received power level is utilized to set a transmit power of a reverse link serving sector to determine handoff.

5. The method of claim 1, further comprising determining a time-domain channel response, comprising:
   obtaining a per sector channel tap estimation of sector specific received signal power.

6. A wireless communications apparatus, comprising:
   a memory that retains instructions related to
      receiving an access point pilot signal from each access point in a plurality of access points,
      determining a time-domain channel response from each of the access point pilot signals,
      establishing a received digital power level per sector from each of the access point pilot signals,
      calculating a received power level from each access point in the plurality of access points, based on at least the respective received digital power level, and
      computing an estimated energy at the output of an analog-to-digital converter (ADC) per sector as $$E_{k,s} = \frac{p_{k,s}}{\sum_s p_{k,s}} E_k,$$

wherein $p_{k,s}$ is a digital power per sector index s and antenna index k, and $E_k$ is the total received power at the output of the ADC and
   an access point represents a sector; and
   a processor, coupled to the memory, configured to execute the instructions retained in the memory.

7. The wireless communications apparatus of claim 6, wherein the received power level from each access point is computed from the digital power level per sector, an Analog Front-End Receiver Gain, a Digital Front-End Receiver Gain and a total received power at an output of the ADC.

8. The wireless communications apparatus of claim 7, wherein the memory further retains instructions related to mapping the estimated energy at the output of the ADC per sector to a dBm power level by normalizing the estimated energy to a full-scale ADC power and subtracting an analog gain.

9. The wireless communications apparatus of claim 6, wherein the determined received power level is utilized to set a transmit power of a reverse link serving sector to determine handoff.

10. The wireless communications apparatus of claim 6, wherein the memory further retains instructions related to obtaining a per sector channel tap estimation of sector specific received signal power.

11. A wireless communications apparatus operable in a wireless communication system, the apparatus comprising:
    means for receiving a plurality of access point pilot signals;
    means for determining a time-domain channel response from each access point pilot signal in the plurality of access point pilot signals;
    means for determining a received digital power level per sector from each access point pilot-signal;
    means for determining a received power level from each access point based on at least the respective received digital power level per sector from each access point pilot signal; and
    means for computing an estimated energy at the output of an analog-to-digital converter (ADC) per sector as $$E_{k,s} = \frac{p_{k,s}}{\sum_s p_{k,s}} E_k,$$

wherein $p_{k,s}$ is a digital power per sector index s and antenna index k, and $E_k$ is the total received power at the output of the ADC.

12. The wireless communications apparatus of claim 11, wherein the received power level from each access point is computed from the digital power level per sector, an Analog Front-End Receiver Gain, a Digital Front-End Receiver Gain, and a total received power at an output of the ADC.

13. The wireless communications apparatus of claim 12, further comprising:
    means for mapping the estimated energy at the output of the ADC per sector to a dBm power level, comprising:
    means for normalizing the estimated energy to a full-scale ADC power, and;
    means for subtracting an analog gain.

14. The wireless communications apparatus of claim 11, wherein the determined received power level is utilized to set a transmit power of a reverse link serving sector to determine handoff.

15. The wireless communications apparatus of claim 11, wherein the means for determining the time-domain channel response further comprises:
    means for obtaining a per-sector channel tap estimation of a sector-specific received signal power.

16. The wireless communications apparatus of claim 11, wherein each of the plurality of access point pilot signals is received from a different access point that represents a sector.

17. A non-transitory machine-readable medium having stored thereon machine-executable instructions for determining a per sector received power level, comprising:
    receiving a plurality of access point pilot signals, wherein each access point pilot signal is from a single access point;
    determining a time-domain channel response from each access point pilot signal in the plurality of access point pilot signals;
    establishing a received digital power level per sector from each access point pilot signal;
    calculating a received power level from each access point based on at least the digital power level, wherein the received power level from each access point is computed from the digital power level per sector, an Analog Front-End Receiver Gain, a Digital Front-End Receiver Gain, and a total received power at an output of an Analog-to-Digital Converter (ADC); and
    computing an estimated energy at the output of the ADC per sector as $$E_{k,s} = \frac{p_{k,s}}{\sum_s p_{k,s}} E_k,$$

wherein $p_{k,s}$ is digital power per sector index s and antenna index k, and $E_k$ is the total received power at the output of the ADC.

18. A non-transitory machine-readable medium of claim 17, wherein the instructions further comprise:
    mapping the estimated energy at the output of the ADC per sector to a dBm power level by normalizing the estimated energy to a full-scale ADC power and subtracting an analog gain.

19. In a wireless communications system, an apparatus comprising:
    a processor configured to:
        receive a plurality of access point pilot signals, wherein each pilot signal is from a different access point;
        ascertain a time-domain channel response from each access point pilot signal;
        determine a received digital power level per sector from each access point pilot signal;
        calculate a received power level from each access point based on at least the digital power level; and
        compute an estimated energy at the output of an analog-to-digital converter (ADC) per sector as $$E_{k,s} = \frac{p_{k,s}}{\sum_s p_{k,s}} E_k,$$

wherein $p_{k,s}$ is a digital power per sector index s and antenna index k, and $E_k$ is the total received power at the output of the ADC.

20. The apparatus of claim 19, wherein the processor further configured to compute the received power level from each access point for the digital power level per sector, an Analog Front-End Receiver Gain, a Digital Front-End Receiver Gain, and a total received power at an output of an Analog-to-Digital Converter.

21. The wireless communications apparatus of claim 6, wherein the processor is integrated with at least one of a cellular telephone, a wireless communication device, an access terminal, a subscriber station, a terminal, a laptop, and a satellite radio.

22. The wireless communications apparatus of claim 11, wherein the apparatus is integrated with at least one of a cellular telephone, a wireless communication device, an access terminal, a subscriber station, a terminal, a laptop, and a satellite radio.

23. A non-transitory machine-readable medium of claim 17, wherein the machine-readable medium is integrated with at least one of a cellular telephone, a wireless communication device, an access terminal, a subscriber station, a terminal, a laptop, and a satellite radio.

24. The apparatus of claim 19, wherein the processor is integrated with at least one of a cellular telephone, a wireless communication device, an access terminal, a subscriber station, a terminal, a laptop, and a satellite radio.

* * * * *